No. 651,381. Patented June 12, 1900.
F. M. PETERS.
LUBRICATOR.
(Application filed Oct. 24, 1898.)
(No Model.)
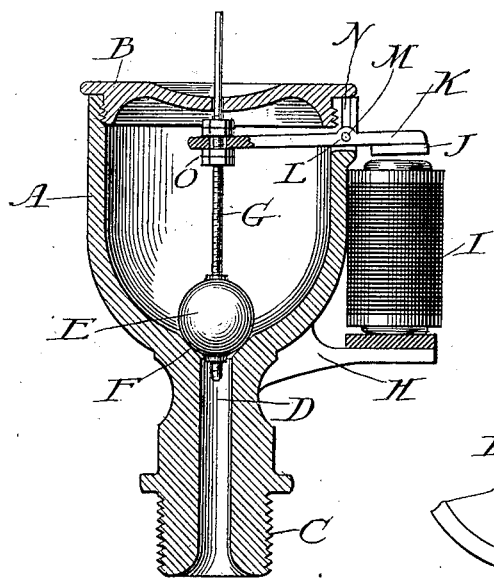
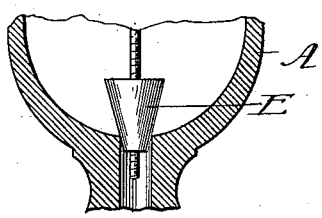
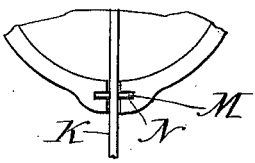
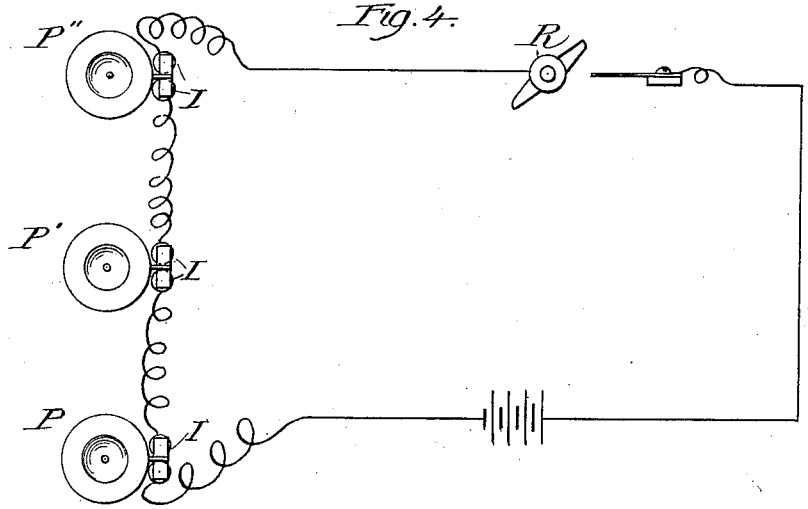
Witnesses:
Frank S Blanchard
O H Waller
Inventor:
Frank M. Peters
By Attorney
Francis M. Ireland
THE NORRIS PETERS CO., PHOTO-LITHO., WASHINGTON, D. C.

UNITED STATES PATENT OFFICE.

FRANK M. PETERS, OF CHICAGO, ILLINOIS.

LUBRICATOR.

SPECIFICATION forming part of Letters Patent No. 651,381, dated June 12, 1900.

Application filed October 24, 1898. Serial No. 694,387. (No model.)

*To all whom it may concern:*

Be it known that I, FRANK M. PETERS, a citizen of the United States, residing at Chicago, in the county of Cook and State of Illinois, have invented certain new and useful Improvements in Lubricators, of which the following is a specification.

My invention relates to oil-cups such as are adapted to be used to supply oil to the journals and bearings of shafting and machines, and has for its object to provide a system of shafting or machinery with a system of oil-cups automatically operated to increase and diminish the supply of oil in response to the varying requirements of the system of shafting or machinery to which it is applied.

My invention is illustrated in the accompanying drawings, wherein—

Figure 1 is a section through an oil-cup, showing the mechanism for operating the valve. Fig. 2 is a detail of an alternate form of valve. Fig. 3 is a detail of the pivot-seat of the valve-operating lever in the wall of the cup. Fig. 4 is a diagrammatic view of a system of such cups in an electric circuit.

The same reference-letter is used to indicate the same part throughout the several views.

The cup or reservoir A is provided with the cap B and may have a threaded extension C for attachment to the part to be oiled. Oil from this cup or reservoir will pass through the opening D to the bearing over which it is placed. The flow of oil from the cup through this opening is controlled by the valve E of any desired form, shown as spherical in Fig. 1 and as conical in Fig. 2. This valve rests upon the valve-seat F of the cup, gravity holding it against such seat to close the opening, and it is provided with the stem G, extending upward, and which may extend, as shown, through an opening in the cap. Seated upon the bracket H, secured to the outside of the cup, as shown, is an electromagnet I, having an armature J. The lever K has its outer end attached to this armature. This lever is pivoted at L. This may be effected by the pin M in the lever having its ends resting in the slots N in the walls of the cup. The inner end of the lever is attached to the valve-stem at O. I have shown an adjustable attachment as follows: The valve-stem passes through a hole in the end of the lever and is threaded at this portion of its length. A nut is provided upon this stem above the lever and another nut below the lever, and these may be turned to raise or lower the position of the lever upon the valve-stem. The effect of this will be to lessen or increase the distance through which the armature moves and correspondingly the extent of the valve-opening.

In Fig. 4 is diagrammatically illustrated a system of such cups operated automatically to open and shut the valves periodically. The cups P P' P'', applied to various portions of a system of shafting or machinery, have their electromagnets in an electric circuit which is adapted to be alternately closed and opened by the operation of the machinery to which the system is applied. A circuit making and breaking device (indicated at R) will be attached to some moving part of the train of machinery, so that when such machinery is in motion this device will be operated thereby. This device may be a wheel having two (as shown) or any number of contacts, which as the wheel turns close and open the circuit. This wheel might be mounted upon any desired shaft of the system of machinery, or the contact-points might be attached directly to such shaft or to some wheel of the system. It is evident, of course, that such circuit-closing device might be equally readily applied to some reciprocating portion of the machinery. The essential point is that the circuit be intermittently closed by the action of the machinery to be oiled.

The use and operation of my invention will be readily understood from the foregoing. All of the oil-cups of a given system of machinery or train of shafting may be connected in a single electric circuit, and the circuit making and breaking device of this circuit will be upon or operated by some moving part of this machinery. When the machinery is not in motion, the circuit is open and the valves of the oil-cups are closed. When now the machinery is put in motion, the circuit making and breaking device will be set in operation and will periodically close and open the circuit. This will periodically energize the magnets and open the valves, thus periodically admitting oil to the machinery.

When the machinery is moving slowly, the oil will be admitted at longer intervals and when moving faster at shorter intervals. The supply of oil is thus automatically regulated, according to the needs of the machinery, from no motion up to full speed. The quantity of oil admitted at each energizing of the magnets may also be regulated, as hereinbefore set forth. This is done by operating the nuts upon the valve-stem to shift the point of attachment of the lever to such stem. By raising this point of attachment the valve-opening will be reduced and by lowering it it will be enlarged.

What I claim as new, and desire to secure by Letters Patent, is—

1. An oil-cup, a perforated cover therefor, a valve-stem having its upper end to extend up through the cover, and which stem is screw-threaded, and a lever extending through the side of the cup and pivoted thereon, its inner end being connected to the valve-stem, combined with nuts upon the valve-stem by means of which the end of the lever can be adjusted vertically, an electromagnet placed upon the side of the cup, and an armature secured to the outer end of the lever, whereby the amount of feed from the cup is regulated at will, substantially as set forth.

2. An oil-cup or lubricator consisting of a reservoir, an opening through which oil is adapted to pass from the reservoir to the part to be oiled, a valve to close said opening provided with a valve-stem, an electromagnet bracketed upon the outside of said cup, and a lever one end of which is attached to the armature of the electromagnet and the other end of which is adjustably attached to the valve-stem, said lever being pivoted in the wall of the cup.

3. An oil-cup or lubricator consisting of a reservoir, an opening through which oil is adapted to pass from the reservoir to the part to be oiled, a valve to close said opening provided with a valve-stem, an electromagnet bracketed upon the outside of said cup, and a lever one end of which is attached to the armature of the electromagnet and the other end of which is adjustably attached to the valve-stem, said lever being pivoted in the wall of the cup by means of a pin passing through the lever and resting at each end in a slot in the wall of the cup, substantially as set forth.

Signed at Chicago, Illinois, the 22d day of October, A. D. 1898.

FRANK M. PETERS.

In presence of—
  F. W. WALLER,
  FRANCIS M. IRELAND.